Jan. 15, 1963 R. HASKINS 3,073,573
TANK ERECTION MECHANISM
Filed Jan. 28, 1960 5 Sheets-Sheet 1

INVENTOR.
Roy Haskins
BY
ATTY.

Jan. 15, 1963 R. HASKINS 3,073,573
TANK ERECTION MECHANISM
Filed Jan. 28, 1960 5 Sheets-Sheet 4

INVENTOR.
ROY HASKINS
BY
ATTY.

Jan. 15, 1963 R. HASKINS 3,073,573
TANK ERECTION MECHANISM
Filed Jan. 28, 1960 5 Sheets-Sheet 5

INVENTOR.
Roy Haskins
BY
ATTY.

United States Patent Office 3,073,573
Patented Jan. 15, 1963

3,073,573
TANK ERECTION MECHANISM
Roy Haskins, S. 1914 Sunrise Road, Spokane, Wash.
Filed Jan. 28, 1960, Ser. No. 5,277
2 Claims. (Cl. 254—89)

This invention relates to a novel apparatus for erecting tanks.

This apparatus is designed to enable one to build large metal storage tanks at ground level, each successive layer being raised after fabrication and a new layer attached to its lower extremity. This system eliminates the need for scaffolding, which is both expensive and dangerous. It allows for faster and more efficient fabrication of tanks such as grain storage tanks.

It is an object of this invention to provide such a mechanism which will automatically raise a partially completed tank and maintain the tank's level position.

It is another object of this invention to provide the elevating structure within the tank, utilizing the tank foundation as its structural base. This elevating structure is also designed to have maximum rigidity so as to survive wind forces and yet is constructed so as to not obstruct normal fabrication procedure.

It is a further object of this invention to provide an elevating structure which is readily adaptable to various diameters of tanks so as to have maximum versatility.

These and further objects will become apparent from the following description and accompanying drawings which illustrate a preferred form of my invention. It is to be noted that the details given are illustrative only and are not intended to limit the scope of this invention.

Figure 1:
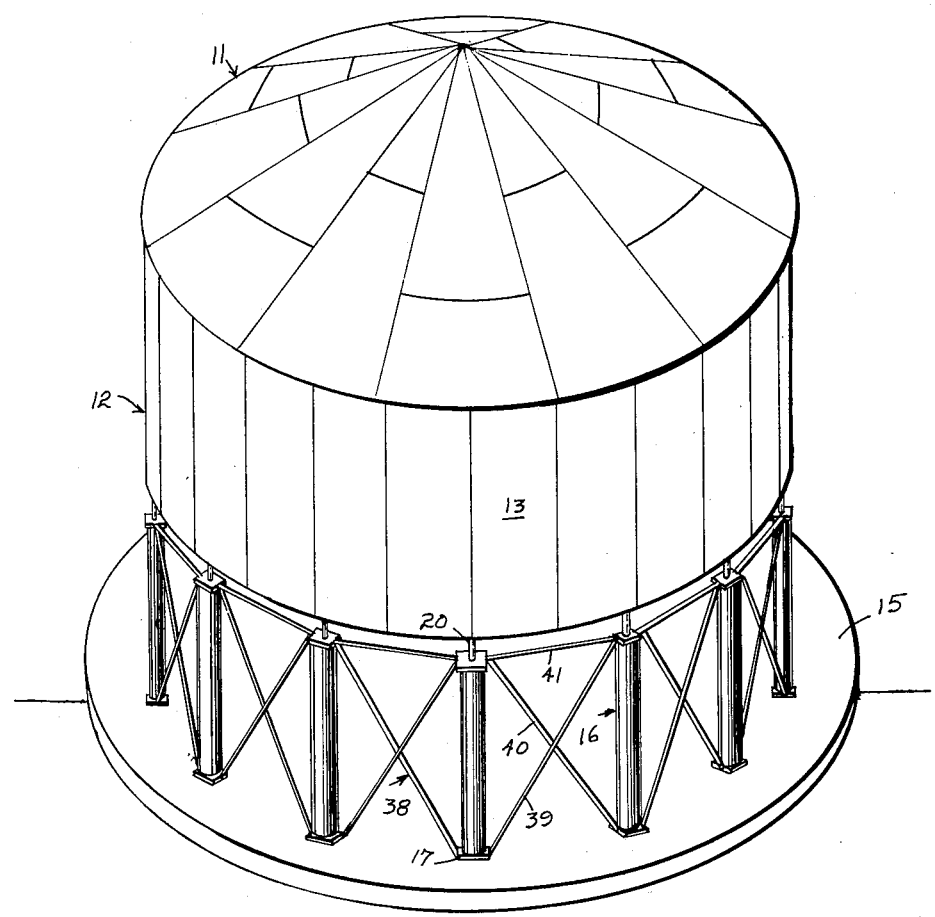
FIGURE 1 is a perspective view of the outside of a tank being assembled according to this invention.
Figure 2:
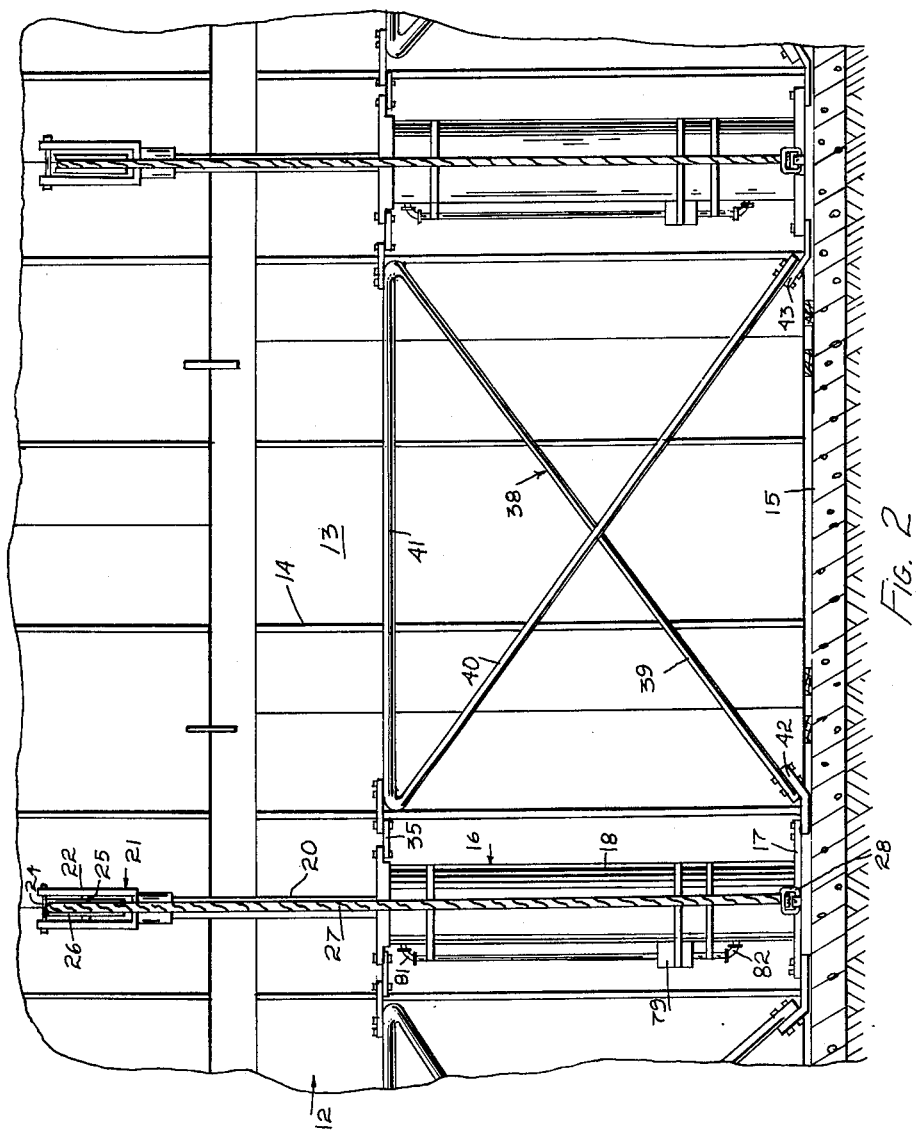
FIGURE 2 is a fragmentary sectional view of the inside of a tank being assembled according to this invention.

Referring now to the drawings, this invention is related to the construction of metal tanks such as generally designated as 10 in FIGURE 1. These tanks are of conventional design and comprise a conical top section 11 and cylindrical sides 12 composed of horizontal rows of metal sheets 13. The individual sheets 13 are welded, bolted or riveted as desired, and are supported by a skeleton of girders 14 located within the tank. The tank rests upon a solid concrete foundation 15 which serves as a floor.

According to this invention, the tank is constructed by first laying the concrete floor and foundation 15 in the usual fashion. Next a series of jacks 16 are arranged and braced in a circle within the circumference of the planned sides. The skeleton of girders 14 is then erected for this first row of sheets 13 and the top section 11, and the outer covering is placed on this skeleton. Then the jacks are simultaneously raised so as to lift the lower edges of the sheets 13 slightly higher than the height of one row of sheets 13. A second row of sheets 13 is then formed on blocks adjacent jacks 16. When this row is completed, the jacks 16 lower the top row of sheets 13 to be joined to the lower row. The jacks 16 then are connected to lift the lower row of sheets 13 and the cycle is again repeated.

This procedure is repeated for each desired row of sheets 13 until the structure is completed. An opening is allowed in the lowest row for removal of the jacks 16 after the lifting is completed. When this opening is sealed as a final step, the tank is complete, having been erected with no need for scaffolding or cranes.

Figure 5:
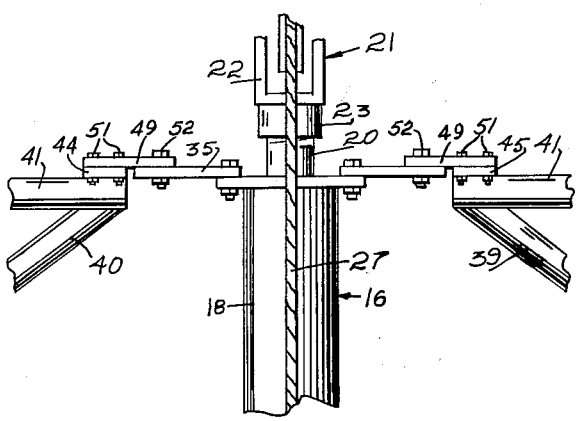
FIGURE 5 is a fragmentary view taken in the direction of line 5—5 in FIGURE 4.
Figure 6:
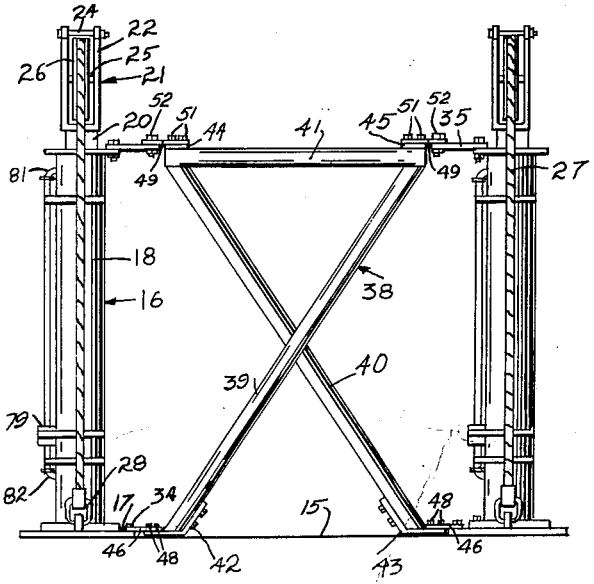
FIGURE 6 is a side view of an assembly consisting of two jacks and one brace.

The apparatus for use in this type of construction will now be described. The jacks 16 are shown in detail in FIGURES 4–6. They are comprised of a rectangular base 17 made of heavy sheet steel. A hydraulic cylinder 18 is bolted to base 17 by means of bolts 19. The cylinder 18 is of the usual double acting type, containing a sealed piston connected to a lifting shaft 20. Upper inlet 81 and lower inlet 82 are provided for hydraulic connections which will be explained later.

Figure 4:
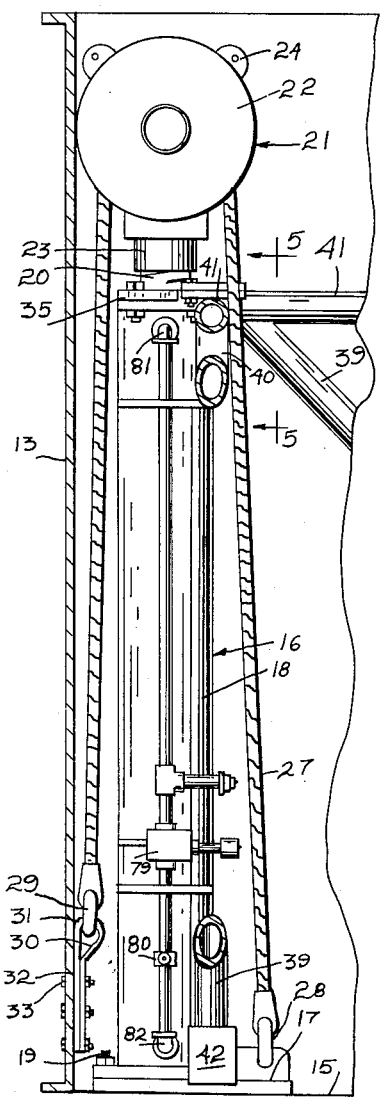
FIGURE 4 is a sectional view taken along line 4—4 in FIGURE 3.

Threadably attached to the upper end of the lifting shaft 20 is a pulley unit 21. This unit 21 comprises two vertical side members 22 which are welded to a tubular element 23 having internal threads to engage the shaft 20. The upper ends of side members 22 are connected by bolts 24. The side members 22 support a stub shaft 25 which rotatably supports a pulley 26. The pulley 26 is formed with an outside groove corresponding to the diameter of a wire rope 27 which is carried over the pulley. The wire rope 27 is fixed at one end to a link coupling 28 fastened to base 17. The other end of wire rope 27 carries a link connection 29 which engages a bar 30 formed as shown in FIGURE 4 to provide a loop 31 and a flat portion 32. The portion 32 is bolted vertically to the lower portion of the sheet to be lifted by means of bolts 33. The pulley connection moves bar 30 twice the distance moved by the jack 16.

The base 17 of each jack 16 is provided with two upstanding lugs 34 placed at either side of the jack. In addition, the top of cylinder 18 has attached thereto at both sides two plates 35 which each have a lug 36 and an aperture 37 formed thereon. Lugs 34 and 36 plus aperture 37 serve to mount the bracing members as will now be described.

The bracing units are composed of a basic frame 38 made of tubular steel welded to form an X configuration with two legs 39, 40 plus a bar 41 which connects the upper ends of legs 39, 40. Welded to the ends of legs 39, 40 are two bent braces 42, 43 made of flat steel and provided with four bolt receiving holes. Two mounting plates 44, 45 are welded to the top end portions of bar 41 and are also provided with four bolt receiving holes. Braces 42, 43 and plates 44, 45 provide interchangeable connections for locking plates whose length can vary dependent upon the number of jacks 16 to be used and the diameter of the tank to be built.

The lower locking plate 46 comprises a flat sheet of steel having four apertures corresponding to the holes in braces 42, 43 which together receive four bolts 48. An aperture is also provided in locking plate 46 which is designed to fit over one of the lugs 34 on the base 17 of a jack 16. The upper locking plate 49 is preferably formed of sheet steel also, but has an angular ear 50 whose angle depends upon the diameter of the tank. The plate 49 has four apertures corresponding to the four bolt receiving holes in plates 44, 45 which together receive four bolts 51. Plate 49 has an aperture which fits over one of the lugs 36. The ear 50 has an aperture cut through it which corresponds to aperture 37. The two apertures are rigidly connected by means of a bolt 52.

From this it may be seen that a common jack and bracing unit may be employed in a wide variety of assembly sizes, the only varying elements being the upper and lower locking plates 49, 46. The length of these plates and the number of jacks necessary for each job must be calculated, taking into account the weight and size involved.

Figure 3:
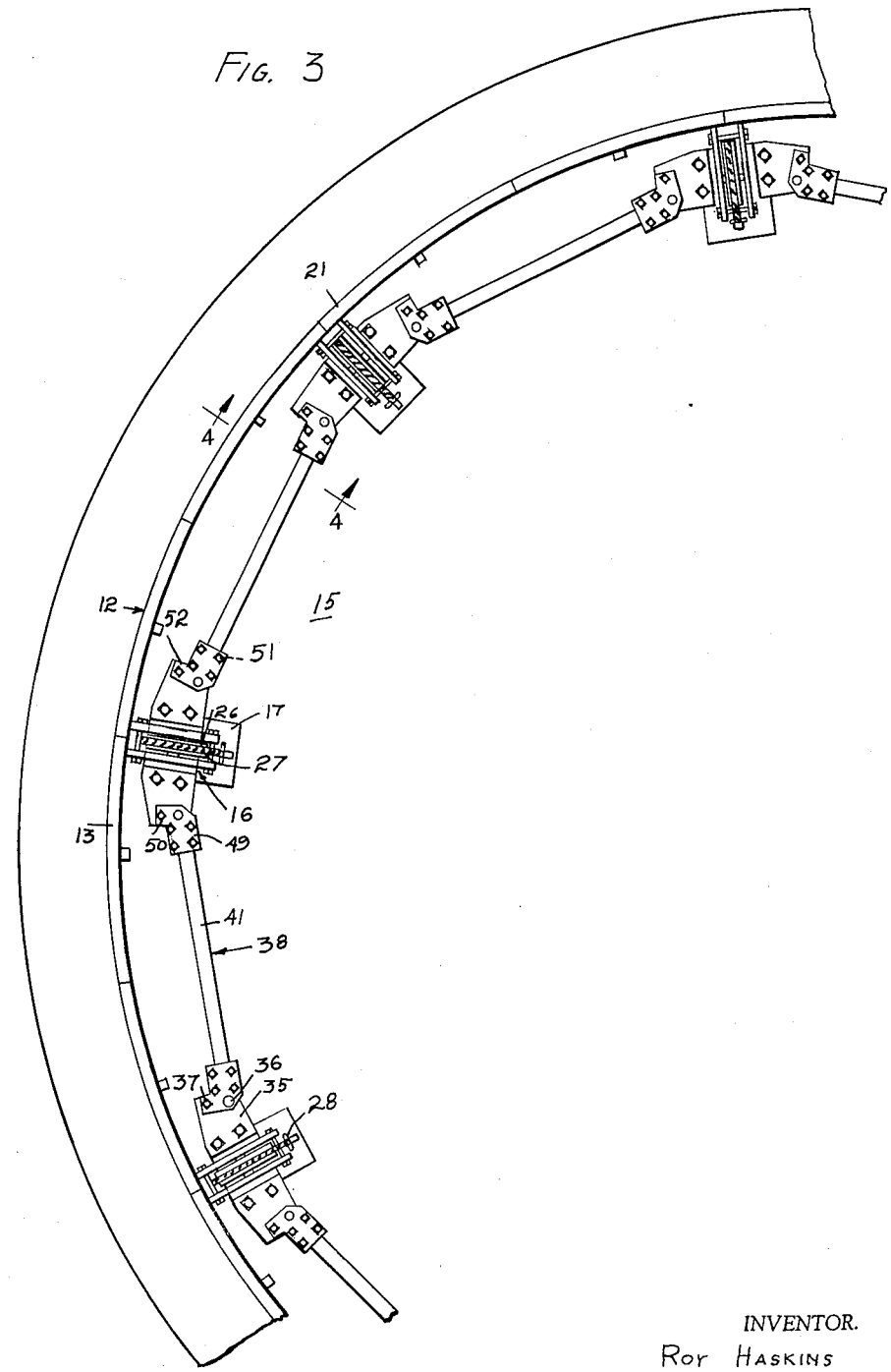
FIGURE 3 is a top view of the assembly shown in FIGURE 1 with the top of the tank removed.

The bracing units and jacks 16 are shown in assembly in FIGURE 3. The braces form chords of a circle having a diameter a fixed distance less than the inner tank diameter, from which size calculations may be made. The hydraulic pressure and capacity of the tanks will limit the weight which may be lifted by a given number of jacks.

In order to lift the completed rows of sheets 13 without damaging the rigid structure of the tank each jack 16 must travel at identical speeds and must cover identical distances to maintain the bars 30 at the same height. The hydraulic controls by which this action is obtained will now be described. Since the various components utilized are all common elements and readily available on the market only a general description of their specific structures will be given.

Figure 7:
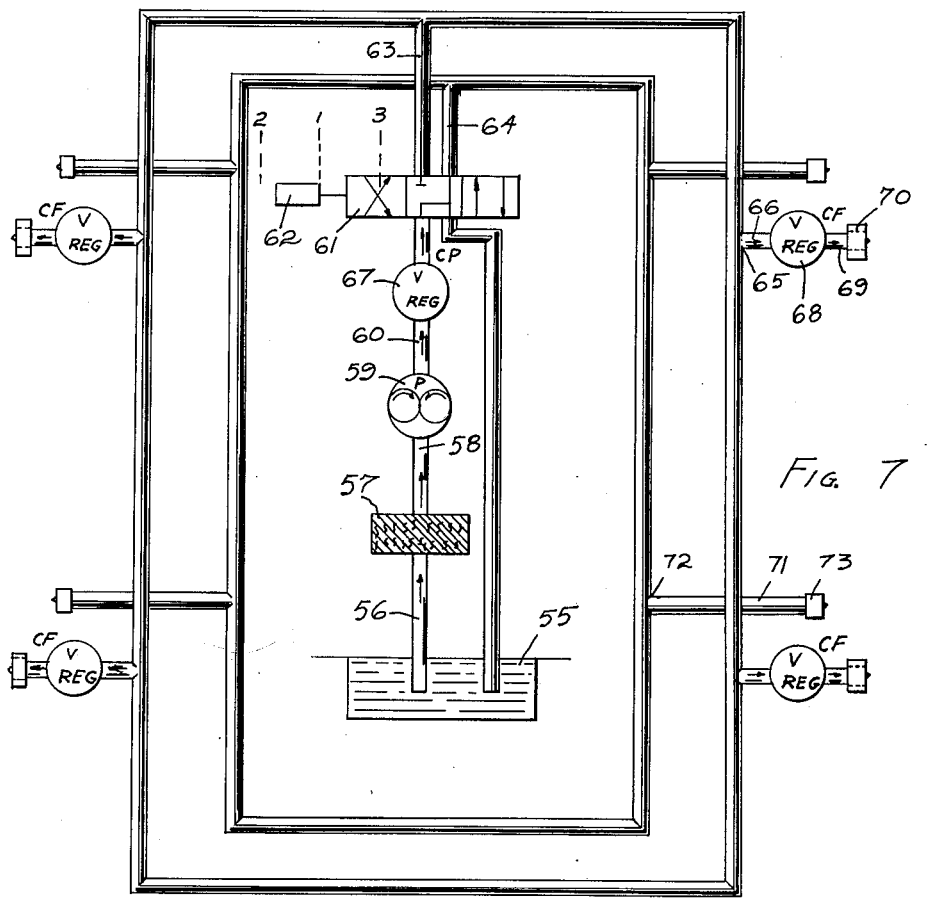
FIGURE 7 is a diagrammatic view of the pump and hydraulic controls in assembly.

The pumping unit is shown in FIGURE 7. These elements are preferably mounted in a portable unit which may be moved from one tank to another with maximum ease. A reservoir 55 is filled with hydraulic fluid and acts as a sump for excess fluid. A feed line 56 from reservoir 55 leads to a filter 57 which removes any foreign matter that might damage the hydraulic apparatus. A second line 58 leads from filter 57 to the input of a pump 59. Pump 59 is preferably a gear pump, but may be any type desired. It is powered by a prime mover (not shown) which may be an electrical motor or gasoline engine. The outlet of pump 59 is connected by means of line 60 to a constant pressure valve 67 and then to a three way valve 61.

Valve 61 may be any one of several types readily available—rotary or sliding. It is shown diagrammatically with a manual handle 62 attached. Two outlet lines are provided, an "up" line 63 and a "down" line 64. In addition, an exhaust line 65 leads from valve 61 to reservoir 55.

The first position of valve 61 shown in FIGURE 7 is a neutral position. The valve 61 blocks "up" line 63 and exhausts both line 60 and "down" line 64. The position to the left, labeled 2 is the "up" position. This connects lines 60 and 63 to send fluid to the "up" line 63 and exhausts "down" line 64. The position to the right labeled 3 is the "down" position and exhausts the "up" line 63 while connecting lines 60 and 64 to pump fluid to the "down" line 64.

The lines 63 and 64 are provided with a plurality of couplings arranged in pairs which are adapted to be connected to jacks 16. Only four pairs are shown in FIGURE 7 but the actual number used will normally be in excess of this. Each pair is identical and therefore only one will be described.

"Up" line 63 has a T-joint 65 opening to a line 66. This line 66 is connected to the input of a flow control valve 68 which regulates the output rate of flow. Valve 68 is adjustable and all valves 68 are adjusted to identical rates of flow. Valve 68 is connected by means of line 69 to a female portion 70 of a quick-coupling. The coupling is of a type which automatically seals each portion when disconnected. Line 71 leading from a T-joint 72 in "down" line 64 is provided with a male portion 73 of an identical quick-coupling. The sealing action of the coupling units used throughout this invention insures filled lines at all times.

This unit allows use of as many jacks 16 as desired. Any excess couplings 70, 73 will remain sealed and the provision of the flow control valves 68 will limit the flow of fluid to each jack 16 regardless of their number. It has been found that no flow control is necessary in lines 71 since the jacks are lowered only inches, while they are normally raised about eight feet.

Figure 8:
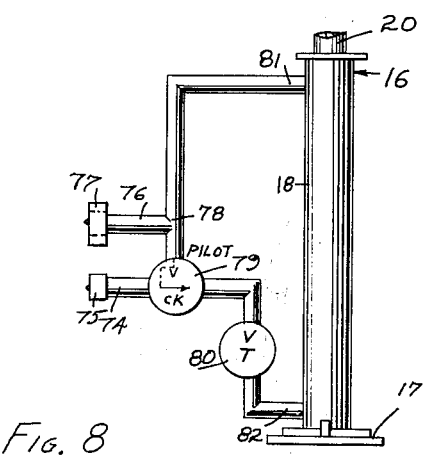
FIGURE 8 is a diagrammatic view of the hydraulic system for each cylinder and piston.

The hydraulic connections to inlets 81 and 82 on each jack 16 are shown in FIGURE 4 and are diagrammatically illustrated in FIGURE 8. A lower line 74 is provided with a male portion 75 of a quick coupling, identical to portion 73 in FIGURE 7, which may be attached directly to portion 70 in FIGURE 7 or may be connected by a flexible hydraulic hose (not shown) having male and female portions of identical couplings. The upper line 76 is provided with a similar female portion 77 of a quick-coupling for connection to portion 73. Line 76 is connected by T-joint 78 to the pilot connection of a pilot check valve 79 located in line 74. Valve 79 is of a type which normally allows flow in line 74 in the direction of the arrow only, but is responsive to pressure in line 76 to allow reverse flow in line 74. Valve 79 is of common manufacture and is not shown in detail in the drawings. An example of such a valve is the pilot operated check valve, No. 25200-2, manufactured by Fluid Controls, Inc., Mentor, Ohio. In normal lifting operation, each valve 79 will operate as a check valve, preventing reverse flow from the lower chamber of the individual jacks 16. Since the pilot pressure will be atmospheric, the valve 79 will not be released until valve 61 is moved to position 3 in FIGURE 7. The pilot pressure from line 76 will then open valves 79, which will allow the fluid to escape from the jacks 16. Should pressure in line 64 fail for any reason, the benefits of a check valve will be obtained by the action of valves 79. Line 74 then leads to a needle valve 80 which serves as a manual control should some part of the system fail and also aids in initially regulating each jack 16. Line 76 leads to the upper inlet 81 of jack 16.

The operation of the jack system is as follows. With valve 61 in position 1 the system retains its "status quo." The jacks 16 will remain raised or lowered since the valve 79 will prevent reverse flow from the lower inlet 22. The pump 59 need not be operated at this time. Movement of valve 61 to position 2 with pump 59 operating will raise each jack 16. The valves 68 allow identical flow to the lower inlet 82 of each jack 16. Movement of valve 61 to position 3 lowers the jacks by pumping them downward. The pilot check valve 79 opens in response to the increased pressure in line 76 to allow flow from bottom inlet 82 to exhaust the lower cylinder. Should pressure in "down" line 64 fail for any reason, valve 79 will automatically prevent further downward movement of the jack 16.

It can thus be seen that a simple safe lifting operation is provided by the foregoing device. Various equivalent components may be substituted without deviating from this basic invention. Therefore this invention is not to be limited by the examples given, except as it is limited by the claims.

Having thus disclosed my invention, I claim:

1. A tank erection apparatus comprising a plurality of lifting means each including a base, a vertical double acting hydraulic cylinder assembly, a pulley carried by the piston of said assembly and a cable fixed at one end to said base, engaged at its central portion upon said pulley and adapted to be fixed at its remaining end to the tank wall; bracing means connecting said lifting means to thereby form a rigid structure within the tank walls, said bracing means comprising an X-frame located between each pair of lifting means, means connecting each lower leg of said X-frame to the base of its adjacent lifting means and means connecting each upper leg of said X-frame to the upper portion of the hydraulic cylinder assembly of its adjacent lifting means; said lifting means and said bracing means thereby forming a rigid support structure for elevating a partially completed tank wall.

2. A tank erection apparatus comprising a plurality of jack structures each including a horizontal base adapted to rest upon a concrete slab, vertical X-frame bracing units interconnecting adjacent jack structures in a circular pattern coaxial with the proposed tank walls, each of said jack structures further including a vertical double acting hydraulic cylinder assembly mounted on the base thereof, said cylinder assembly including a movable piston having a shaft extending upwardly, a pulley rotatably mounted on the upper end of the shaft about a horizontal axis and a flexible cable engaged by the upper portions of the pulley, the two ends of the cable being fixed respectively to the base of the jack structure and to the tank wall to be raised, and individual hydraulic control means operatively connected to the cylinder assembly of each jack structure including a pilot operated check valve having an inlet coupled to fluid supply means, an outlet coupled to the lower hydraulic chamber of the cylinder assembly and its pilot connection coupled to the upper hydraulic chamber of the cylinder assembly.

References Cited in the file of this patent

UNITED STATES PATENTS

| | | |
|---|---|---|
| 1,955,154 | Temple | Apr. 17, 1934 |
| 2,631,008 | Kroll et al. | Mar. 10, 1953 |
| 2,729,941 | Rose et al. | Jan. 10, 1956 |
| 2,794,242 | Evers et al. | June 4, 1957 |
| 2,836,054 | Baruer | May 27, 1958 |
| 2,874,641 | McCandlish et al. | Feb. 24, 1959 |
| 2,919,896 | Wurst | Jan. 5, 1960 |